N. H. DAVIS.
AIR BRAKE APPARATUS.
APPLICATION FILED OCT. 30, 1908.
945,758.
Patented Jan. 11, 1910.
3 SHEETS—SHEET 1.
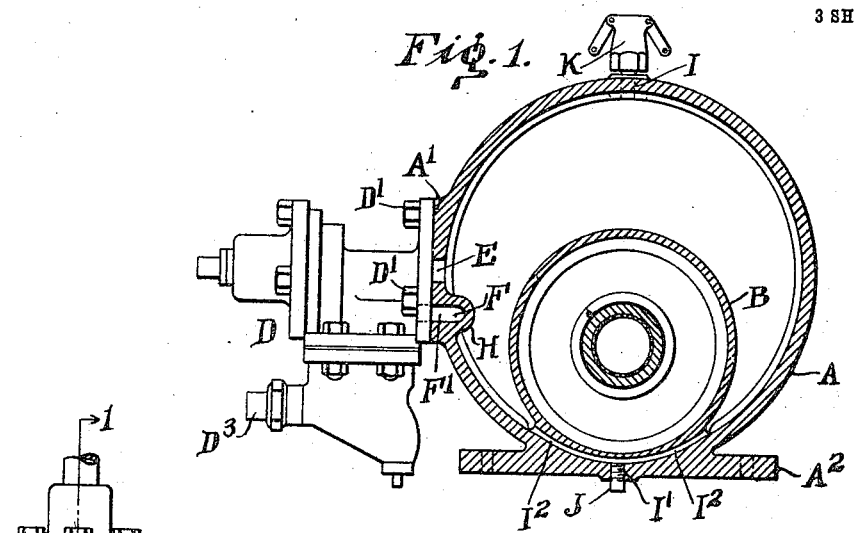
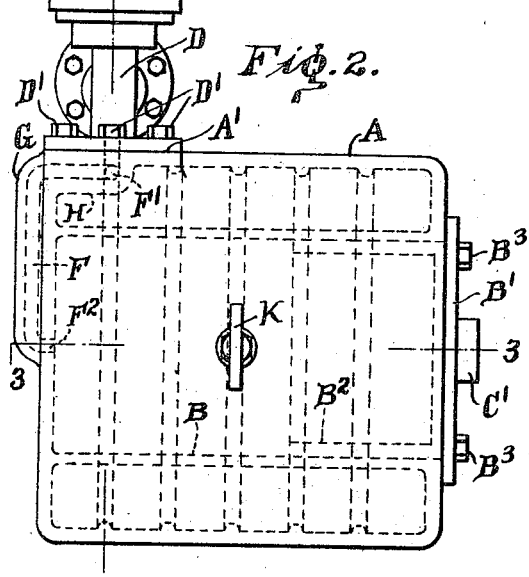
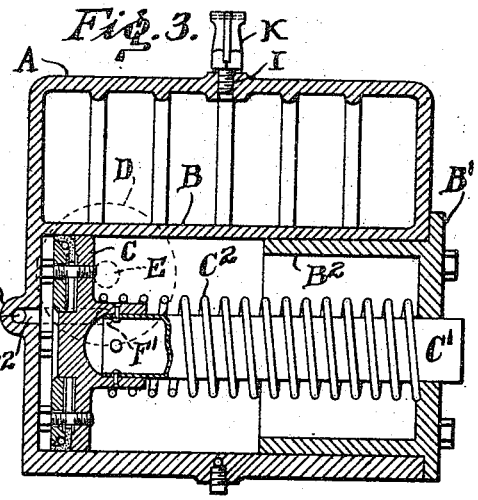
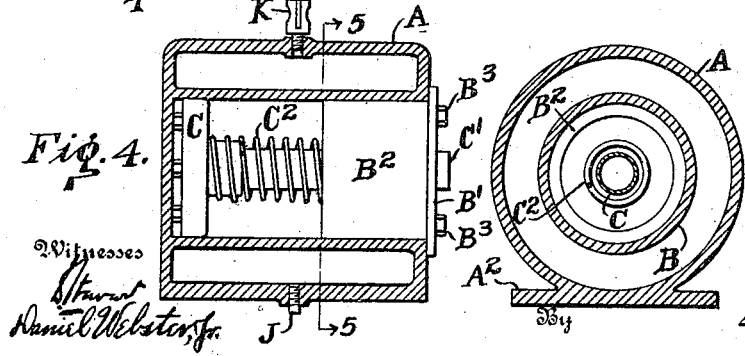

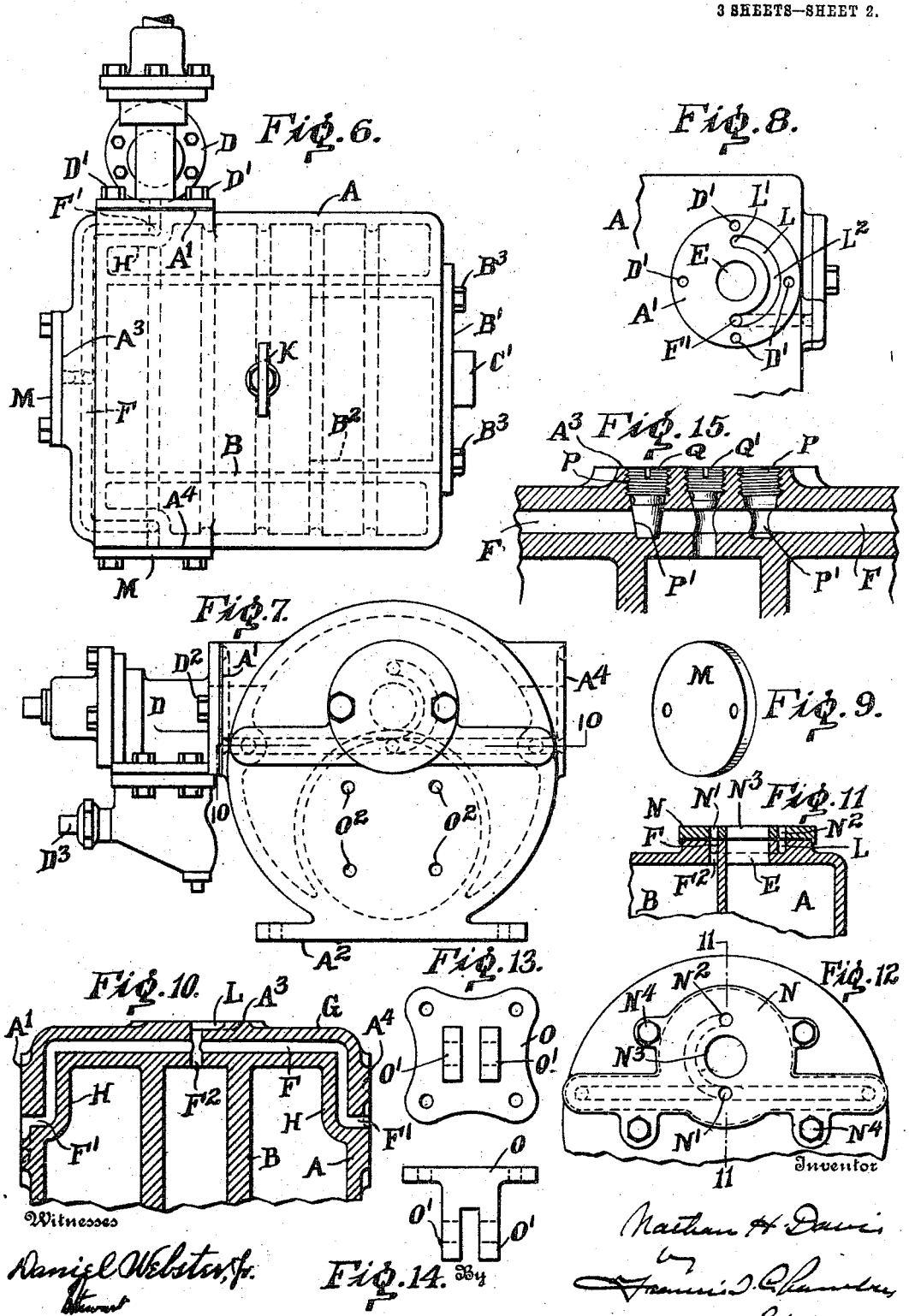

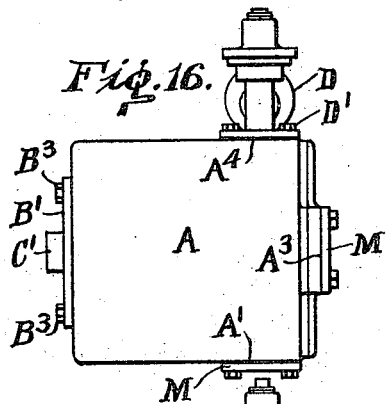
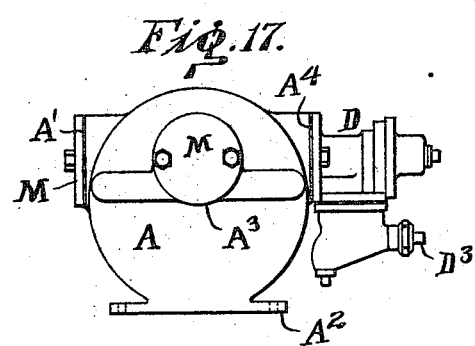
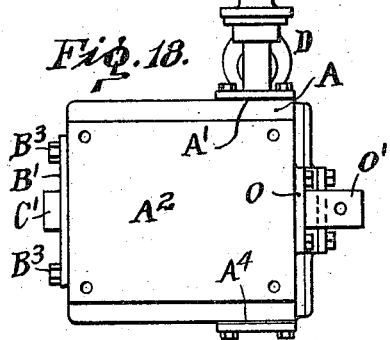
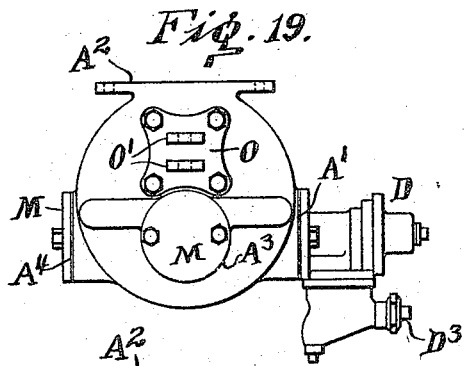
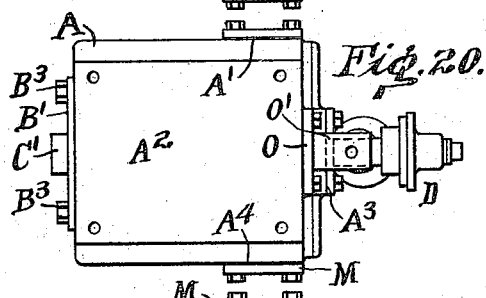
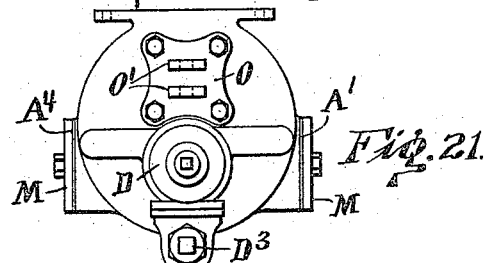
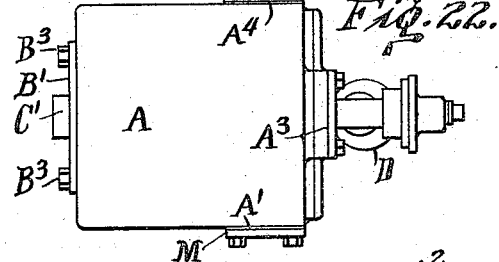
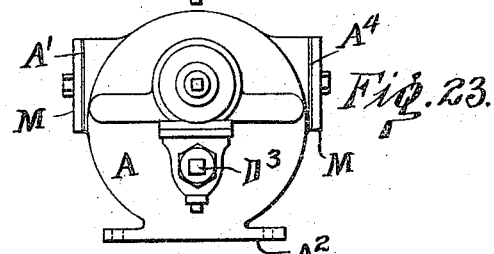
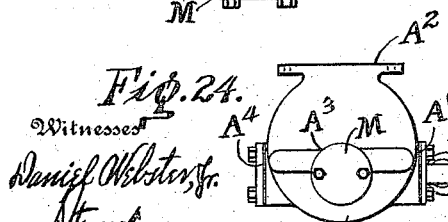
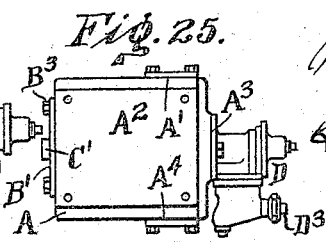

UNITED STATES PATENT OFFICE.

NATHAN H. DAVIS, OF PHILADELPHIA, PENNSYLVANIA.

AIR-BRAKE APPARATUS.

945,758.

Specification of Letters Patent.  Patented Jan. 11, 1910.

Application filed October 30, 1908. Serial No. 460,200.

*To all whom it may concern:*

Be it known that I, NATHAN H. DAVIS, a citizen of the United States of America, residing in the city and county of Philadelphia, in the State of Pennsylvania, have invented a certain new and useful Improvement in Air-Brake Apparatus, of which the following is a true and exact description, reference being had to the accompanying drawings, which form a part thereof.

In the standard railway brake systems now in general use, each car equipped with air brakes has mounted on it, an auxiliary reservoir, a brake cylinder, and a triple valve connected to the train pipe, to the auxiliary air reservoir and to the brake cylinder. The brake cylinder, auxiliary reservoir and the triple valve are instrumentalities, the construction and operation of which are well known to those skilled in the art, and it will be sufficient herein to point out, that, as usually arranged; the brake cylinder contains a piston which is linked or otherwise mechanically connected to the car brakes and is normally held by a spring in one end of the brake cylinder, when the brakes are off, and is moved toward the other end of the cylinder to apply the brakes when air is admitted to the brake cylinder. The auxiliary reservoir is for storing a supply of air acquired gradually from the train pipe during the periods when the brakes are released, which is admitted to the brake cylinder to move the piston when the brakes are to be applied. And the triple valve serves to control the exhaust from the brake cylinder when the brakes are to be released and to control communication between the train pipe and the auxiliary reservoir and between the auxiliary reservoir and the brake cylinder, and under certain conditions between the train pipe and the brake cylinder directly.

Heretofore numerous different relative arrangements of the brake cylinder and auxiliary reservoir have been employed. Under some conditions the reservoir and brake cylinder have been placed end to end and rigidly connected together; under other conditions the reservoir and brake cylinder have been placed in line with each other but spaced apart; the reservoir and cylinder have also been placed side by side in some cases and in other cases have been placed at right angles to each other. The exact arrangement employed has depended in some instances simply on the character of the brake gear, but has usually been determined wholly or largely by the restricted space conditions in which the apparatus is installed.

As is well known, the auxiliary reservoir and the brake cylinder are usually and preferably located beneath the car body, and frequently the car construction is such that the arrangement of brake cylinder and reservoir which would otherwise be preferable is made impossible by the restricted space conditions. In all arrangements, however, which have heretofore gone into practice, so far as I am aware, the auxiliary reservoir and the brake cylinder have been separate and independent mechanical entities, and piping has been employed to connect the triple valve either to the auxiliary reservoir or to the brake cylinder or to both of these elements.

The main object of the present invention is to simplify and improve the air brake apparatus located on a car by combining the auxiliary reservoir and the brake cylinder in a single and effective mechanical structure in which the auxiliary reservoir surrounds the brake cylinder and to which the triple valve may be readily attached. Preferably, the brake cylinder and the auxiliary reservoir are formed for the most part in one casting having integral portions closing both ends of the reservoir and one end of the brake cylinder, and which is provided with passages running from the reservoir and brake cylinder to a seat or seats against which the triple valve may be secured. By proceeding in this manner, I economize in the cost of production and installation. I also produce a more compact arrangement of the apparatus highly adapted to the restricted space conditions under which the apparatus is to be installed. I also obtain a more efficient operation of the air brake apparatus, since on account of the decreased amount of conduit space connecting the reservoir and brake cylinder to the triple valve, which space is alternately filled with air under pressure and then exhausted to the atmosphere as the brakes are applied and released, less air is required with my invention than with the apparatus heretofore employed.

A further object of the invention is to form and arrange the combined auxiliary reservoir and brake cylinder structure in such manner as to make it cheap and easy to construct and install, and in particular, to so form and arrange this structure that it may be readily and interchangeably used in the various locations and with the various braking mechanism desirable in practical operation. This I accomplish in a large measure by forming the combined air reservoir and brake cylinder with a plurality of interchangeably used seats for the triple valve so located that the triple valve may be arranged with the desired accessibility for inspection and repairs under the different conditions in which it may be found necessary in practice to install the air reservoir and brake cylinder.

The various features of novelty which characterize my invention are pointed out with particularity in the claims annexed to and forming a part of this specification. For a better understanding of the invention, however, and the advantages possessed by it, reference may be had to the accompanying drawings and descriptive matter, in which I have illustrated and described various forms in which the invention may be embodied.

Figure 1 is a sectional end elevation of one form of apparatus embodying my invention, the section being taken on the line 1—1 of Fig. 2. Figure 2 is a plan view of the apparatus shown in Fig. 1. Fig. 3 is a sectional elevation taken on the line 3—3 of Fig. 2 Fig. 4 is a sectional view of a modified form of apparatus. Fig. 5 is a sectional end elevation taken on the line 5—5 of Fig. 4. Fig. 6 is a plan view of another modification of the apparatus especially designed for interchangeable use in different conditions. Fig. 7 is an end elevation of the apparatus shown in Fig. 6. Fig. 8 is a partial side elevation of the same apparatus. Fig. 9 is a perspective view of a cover plate employed in the modification of the invention. Fig. 10 is a partial sectional plan taken on the line 10—10 of Fig. 7. Fig. 11 is a partial sectional plan representing a slightly modified form of the apparatus and taken on the line 11—11 of Fig. 12. Fig. 12 is a partial end elevation. Fig. 13 is an end elevation and Fig. 14 is a plan view of an adjunct which may be used under some conditions with the combined brake cylinder and air reservoir. Fig. 15 is a view taken similarly to Fig. 10 illustrating a modification. Each of the pairs of Figs. 16 and 17, 18 and 19, 20 and 21, 22 and 23 consists of a plan and end elevation respectively, showing the apparatus of Figs. 6 to 10 inclusive in a position in which the apparatus may be set up which differs from the positions shown by the other similar figures; and Figs. 24 and 25 are plan views, each illustrating an arrangement different from that shown by any of the other figures.

Referring first to the construction shown in Figs. 1 to 3 inclusive, A represents the air reservoir and B the brake cylinder, which is inclosed by the air reservoir and in reality forms the inner wall of the air reservoir. The reservoir A, which is preferably cylindrical in form as shown to enable it to better resist bursting stresses, and the cylinder B are integrally connected, being formed of a one piece casting, except that the head $B^1$ for one end of the cylinder B is separate from the rest of the combined reservoir and brake cylinder. The head $B^1$ is secured in place by bolts $B^3$, which are tapped into the corresponding end wall of the reservoir A. The brake piston C working in the cylinder B has its stem $C^1$ projecting through the head $B^1$ and is normally held in the brake release position shown in Fig. 3 by a spring $C^2$. A sleeve $B^2$ carried by the head $B^1$ and extending into the cylinder B forms a stop limiting the movement of the piston C in the brake applying direction. The triple valve D is secured by bolts $D^1$ against the seat $A^1$ formed for the purpose on the side of the cylinder A. $D^3$ represents the train pipe connection to the triple valve. A port E through the wall of the cylinder A serves to connect the interior of the triple valve with the interior of the air reservoir A. Ports $F^1$, $F^2$ and passage F serve to connect the triple valve with the interior of the brake cylinder B. As shown, the passage F is formed partly in the rib G projecting externally from the end of the cylindrical body A and partly in a rib H projecting into the interior of the body A. The body A is provided with longitudinal wings or flanges $A^2$ apertured to receive the bolts by which the combined brake cylinder and reservoir is secured in place on the car. Vent ports I and $I^1$ are formed through the wall of the cylinder A at opposite sides. The port $I^1$, which is formed in the side of the cylinder A, which is lowermost when the latter is in the position shown in Fig. 1, does not lead through the wall of the cylinder B, but opens through lateral ports $I^2$ into the interior of the air reservoir space A surrounding the brake cylinder at opposite sides of the wall portion common to the air reservoir and brake cylinder. The ports $I^1$ and $I^2$ are formed in this common wall portion. The usual release valve for exhausting air from the air reservoir when necessary is secured to the cylinder A, and controls port I, and the usual drain cock J is secured to the cylinder A in communication with the port $I^1$. It will be understood that the release valve K and drain cock J are interchanged when the combined air reservoir and brake cylinder is mounted with the side from which the flanges $A^4$ extend uppermost.

Among the advantages possessed by the construction illustrated in Figs. 1 to 3 inclusive are the following: The effective length of the combined air reservoir and brake cylinder structure need be no greater than the length of the brake cylinder structure heretofore used. The diameter of the air reservoir A is substantially less than the width of the space which would be occupied by an air reservoir of similar capacity and a separate brake cylinder similar to the brake cylinder B if they were placed side by side. Indeed, since the effective capacity of the auxiliary reservoir varies with the square of the diameter of the combined structure and since, moreover, the capacity of the auxiliary reservoir is usually substantially greater than the volume of the brake cylinder, the diameter of the combined brake cylinder and reservoir does not greatly exceed the diameter of the air reservoir of the prior act. This increase in diameter is in general quite immaterial, since in most, if not all, cases the space conditions will permit a substantial increase in this dimension. While owing to the increased diameter of the air reservoir, the combined structure may be slightly heavier than the separate air reservoir and brake cylinder, this is a matter of no appreciable importance. With the construction described, the passage F and ports $F^1$, $F^2$ are relatively short and hence the volume of the air filling them when the brakes are applied and lost when the brakes are subsequently released is relatively small.

The construction disclosed is one easy to make, the casting can be readily made, and the machining required is comparatively such that the construction, moreover, is one well designed to resist the stresses to which it is subjected in operation, for instance, the wall of the cylinder B operates as a stay tying together the end walls or heads of the structure. Obviously, less labor and time is required in assembling a combined reservoir and brake cylinder on a car than is required where an air reservoir and a separate brake cylinder are installed, especially as, in installing the new construction, no pipe fitting other than that of attaching the train pipe connection to the triple valve is necessary.

While I prefer a construction like that shown in Figs. 1 to 3 inclusive, in which the brake cylinder is eccentrically disposed in the auxiliary reservoir and is connected to the latter along one side, the brake cylinder may be centrally disposed in the reservoir as shown in Figs. 4 and 5.

In the construction illustrated in Figs. 6 to 10 inclusive, three seats $A^1$, $A^4$ and $A^3$ are provided, against any one of which the triple valve D may be secured. The seats $A^1$ and $A^4$ are formed on opposite sides of the cylinder A and the seat $A^3$ at the end of the cylinder. The ports and passages leading to these seats are formed in such manner that the triple valve may not only be operatively connected to the auxiliary reservoir and the brake cylinder when clamped against any one of these seats, but also when clamped in different positions against each of said seats. As shown in Fig. 8, in addition to the ports E and $F^1$ opening outwardly into each seat, a curved channel L is formed which leads from the port $F^1$ to a point $L^1$ diametrically opposed to the port F, so that when the triple valve is turned upside down for instance from the position shown in Fig. 7, the port in the triple valve which registers with the port $F^1$ will then register with the end of the channel L at the point $L^1$, and, of course, when the triple valve is turned so that the portion which extends down in Fig. 7 extends to the right in Fig. 8, the triple valve will still be in communication with the brake cylinder through the port $F^1$, passage F and port $F^2$, the port in the triple valve then being over the point $L^2$. It will be understood that the bolts $D^1$, by which the triple valve is clamped in place, are so arranged as to permit the desired adjustment in the position of the triple valve to be readily made. The conduits opening into each pair of the seats $A^1$, $A^4$ and $A^3$, against which the triple valve is not clamped, are closed by cover plates M.

To facilitate the casting operation, the passage F and channel L of seat $A^3$ may open at the end of the reservoir A, as shown in the construction illustrated in Figs. 11 and 12. In this construction, a cover member N is clamped in place against the cylinder A by bolts $N^4$ to form the outer wall of the passage F and the corresponding channel L, diametrically opposed ports $N^1$ and $N^2$ being formed in the member N in register with the port $F^2$ and the diametrically opposed end of the channel L. The member N is, of course, provided with a port $N^3$ in register with the port E of the reservoir A.

In some brake gears it is desirable to attach a brake lever to the opposite end of the combined reservoir and brake cylinder from that through which the piston stem $C^1$ projects. For this purpose I provide a member or jaw O having apertured ears $O^1$ between which a lever or other element of the brake gear may be secured, and I form the cylinder with threaded sockets $O^2$ for the bolts which may be employed in securing the jaw O in place. In the construction shown it is apparent from Figs. 19 and 20, the bolts for securing the jaw O to the end of the brake cylinder and air reservoir structure are symmetrically disposed, and the base of the jaw O is symmetrical with respect to these bolts. This symmetrical arrangement is preferred, for it permits the jaw O and the structure to which it is secured to be secured together in different relative positions. In consequence, no change need be made in the arrangement of the brake lever or other part of the brake rigging to which the jaw is connected when the air reservoir and brake cylinder structure is placed with the flanges $A^2$ vertical instead of horizontal as shown in Figs. 19 and 20.

The provision on the combined auxiliary reservoir and brake cylinder of a plurality of suitably disposed seats, as the seats $A^1$, $A^4$ and $A^3$ of the construction shown in Figs. 6 to 10 inclusive, against any one of which the triple valve may be secured in different positions, permits such a form of the combined auxiliary air reservoir and brake cylinder structure to be employed under nearly if not quite all of the conditions found in railway practice, and this without requiring any pipe fitting to connect the triple valve with the air reservoir or brake cylinder in installing the apparatus under the different conditions. For instance, with the construction shown in Figs. 6 to 10 inclusive, Figs. 6 and 7 illustrate the position of the apparatus when installed with the flanged or pad portion $A^2$ down and with the triple valve at the left when facing in the direction in which the piston stem $C^1$ moves out of the brake cylinder.

Figs. 16 and 17 illustrate the position of the apparatus when installed with the flanged portion $A^2$ down, as in Figs. 6 and 7, but with the triple valve D on the opposite side of the structure from that illustrated in Figs. 6 and 7.

Figs. 18 and 19 show the position of the apparatus with the flanged portion $A^2$ up and the triple valve D at one side. It will, of course, be understood that with the flange $A^2$ uppermost, the triple valve might be secured against the seat $A^4$ instead of against the seat $A^1$, as shown in Figs. 18 and 19.

In Figs. 20 and 21, the flanged portion $A^2$ is uppermost and the triple valve is secured against the seat $A^3$ at the end of the structure.

In Figs. 22 and 23, the triple valve is also secured against the end of the structure, but in this arrangement, the flanged portion $A^2$ is at the bottom.

In the arrangement illustrated in plan in Fig. 24, the axis of the brake cylinder is vertical and the triple valve is secured against the seat $A^1$. It will, of course, be understood that it might be secured as well against the seat $A^4$.

In the arrangement illustrated in plan in Fig. 25, the axis of the brake cylinder is horizontal, but the flanges $A^2$ are arranged to be secured against a vertical wall. In this arrangement, the triple valve is secured against the seat $A^3$, but is given a quarter turn from the position shown in Fig. 21 or Fig. 23.

The provision of the plurality of seats, against any one of which the triple valve may be secured, thus permits a construction such as that illustrated in Figs. 6 to 10 inclusive to be put into practically universal use, while at the same time the triple valve may be located in the position of easiest accessibility and in the desired upright position, which, with a triple valve in the form shown, is that in which the train pipe connection $D^3$ is below the body of the valve. While the construction illustrated in Figs. 6 to 10 inclusive possesses all the mechanical advantages of that shown in Figs. 1 to 3 inclusive and, in addition, is adapted for practically universal use, the construction of Figs. 6 to 10 inclusive is slightly less advantageous than that of Figs. 1 to 3 inclusive, in that the volume of the passages open to the brake cylinder is greater, and, as I have explained, the air filling these passages when the brakes are being applied is wasted when the brakes are released. This disadvantage of the universal construction over a construction with only one seat such as that shown in Figs. 1 to 3 inclusive, can easily be done away with, however, by some such plan as that illustrated in Fig. 15, where threaded openings P are formed in the seat $A^3$ terminating at their inner ends in conical seats $P^1$ for plug valves Q, which may be screwed into place to close the passage $F^1$ at one or both sides of the port $F^2$. In Fig. 15, the portion of the passage F running to the seat $A^1$ is closed while the portion of the passage running to $A^4$ is open. A plug valve $Q^1$ may similarly be provided for closing the port $F^2$ as shown in Fig. 15, when desired. It will be understood, of course, that the number and location of the seats for the triple valve which it is necessary or desirable to provide on the combined reservoir and brake cylinder will depend upon the conditions under which the apparatus is used. For instance, if not needed, any one, or any pair of the seats $A^1$, $A^3$ and $A^4$ in Figs. 6 to 10 inclusive may be omitted.

While, in accordance with the provisions of the statutes, I have illustrated and described the best forms in which the invention may be embodied of which I am now aware, it will be obvious to all those skilled in the art that numerous changes in form and arrangement can be made without departing from the spirit of my invention, and I do not wish the claims hereinafter made to be limited to the particular forms of apparatus disclosed more than is made necessary by the state of the art.

Having now described my invention, what I claim as new, and desire to secure by Letters Patent is—

1. In railway brake apparatus, a one piece auxiliary reservoir and brake cylinder casting formed with a cylindrical chamber for the brake applying piston, and with a surrounding chamber for the storage of air under pressure, said casting being formed with integral end portions closing both ends of said surrounding chamber and one end of said piston chamber.

2. In railway brake apparatus a one piece auxiliary reservoir and brake cylinder casting formed with a cylindrical brake piston chamber closed at one end and open at the other end for the insertion and removal of the piston, and with a chamber for the storage of air under pressure, said chamber being closed at both ends and surrounding the brake piston chamber.

3. In a railway brake apparatus a one piece auxiliary reservoir and brake cylinder casting formed with a cylindrical brake piston chamber closed at one end and open at the other end for the insertion and removal of the piston, and with a chamber for the storage of air under pressure, said chamber being closed at both ends and surrounding the brake piston chamber, and a detachable head for the open end of the brake piston chamber provided with means projecting into the brake piston chamber for limiting the movement of the piston in the brake applying direction.

4. In a railway brake apparatus, a structure provided with an auxiliary reservoir chamber and formed with a plurality of external seats against any one of which a triple valve may be secured, and with ports or passages opening one at each valve seat and communicating with said chamber, and means for closing communication from said chamber through the ports or passages opening at the seats against which the triple valve is not secured.

5. The combination in a railway brake apparatus, of a structure provided with an auxiliary reservoir chamber, a triple valve, and means for securing said valve and structure together in different angular relations, said structure and triple valve having ports adapted to communicate with each other in the different angular relations in which the valve and structure may be secured together.

6. In railway brake apparatus, a combined auxiliary reservoir and brake cylinder structure formed with a brake piston chamber and with a surrounding chamber for the storage of air under pressure, said stucture being adapted to have a triple valve secured to it in different positions, and being formed with ports for placing both of said chambers in communication with the triple valve in the different positions in which the triple valve may be secured to the structure.

7. In railway brake apparatus, a one piece auxiliary reservoir and brake cylinder casting formed with a chamber for the brake applying piston, and with a surrounding chamber for the storage of air under pressure, said casting being adapted to have a triple valve secured to it in different positions with respect thereto, and being formed with ports adapted to connect the triple valve with the brake piston chamber and storage reservoir in the different positions in which the triple valve may be secured against the structure.

8. In railway air brake apparatus, a combined auxiliary reservoir and brake cylinder structure, in which the reservoir surrounds the brake cylinder and in which the structure is provided externally with a plurality of seats against any one of which a triple valve may be secured and is formed with passages leading from the auxiliary reservoir and brake cylinder to said seats, and means for closing the passages running to the said seats against which the triple valve is not secured.

9. In railway air brake apparatus, a combined auxiliary reservoir and brake cylinder structure, in which the reservoir surrounds the brake cylinder and in which the structure is provided externally with seats at opposite sides, against either of which a triple valve may be secured and is formed with passages leading from the auxiliary reservoir and brake cylinder to each of said seats, and means for closing the passages running to the seats against which the triple valve is not secured.

10. In railway air brake apparatus, a combined auxiliary reservoir and brake cylinder structure, in which the reservoir surrounds the brake cylinder and in which the structure is provided externally with seats on opposite sides and with a seat at one end, against any one of which a triple valve may be secured, and is formed with passages running to each seat from the reservoir and brake cylinder, and means for closing the passages running to any one of said seats when the triple valve is not secured against such seat.

11. In railway air brake apparatus, a one piece auxiliary reservoir and brake cylinder casting formed with a cylindrical chamber for the brake applying piston and with a surrounding chamber for the storing of air under pressure and formed with a plurality of external seats, against any one of which a triple valve may be secured, and with a passage leading from each seat to the interior of the air reservoir and with a passage leading from each seat to the brake cylinder, and means for closing the passages running to the seats against which the triple valve is not secured.

12. In railway air brake apparatus, a one piece auxiliary reservoir and brake cylinder casting formed with a cylindrical chamber for the brake applying piston and with a surrounding chamber for the storing of air under pressure and formed with a plurality of external seats, against any one of which a triple valve may be secured, and with a passage leading from each seat to the interior of the air reservoir, and with a passage leading from each seat to the brake cylinder, means for closing, at points adjacent the brake cylinder, the passages running from the brake cylinder to such of the seats as do not have the triple valve secured against them, and means for closing, at the seats against which the triple valve is not secured, the passages leading from the air reservoir to such seats.

13. In railway air brake apparatus, a one piece auxiliary reservoir and brake cylinder casting formed with a cylindrical chamber for the brake applying piston and with a surrounding chamber for the storing of air under pressure and formed externally with a seat, against which a triple valve may be clamped, and with a passage leading from the piston chamber to said seat, and a passage leading from said surrounding chamber to said seat, the passage leading from said piston chamber being open at various points in the face of said seat, whereby the triple valve may be operatively secured against said seat in different positions.

14. In railway air brake apparatus, a combined auxiliary air reservoir and brake cylinder structure, in which the reservoir surrounds the brake cylinder, a piston working in said brake cylinder, a stem therefor extending through one end wall of said structure, means for detachably securing a brake gear part to the opposite end of said structure and in line with said stem, and means for securing a triple valve against the external wall of said structure with its ports in communication with the reservoir and brake cylinder.

15. In railway brake apparatus, a combined auxiliary air reservoir and brake cylinder structure in which the brake cylinder is located within the air reservoir with its axis parallel to and at one side of the axis of the reservoir and is integrally connected along one side with the air reservoir whereby said reservoir and cylinder have a common wall portion, said structure being provided with a vent passage formed in said common wall portion leading to the exterior of the structure from the reservoir space.

16. In railway brake apparatus, a combined auxiliary air reservoir and brake cylinder structure in which the brake cylinder is located within the air reservoir with its axis parallel to and at one side of the axis of the reservoir and is integrally connected along one side with the air reservoir whereby said reservoir and cylinder have a common wall portion, said structure having a vent port formed in the common wall portion and channels formed in said wall portion connecting said port with the reservoir space at opposite sides of said common wall portion.

17. The combination in a railway air brake apparatus of a structure provided with a brake piston chamber, a jaw adapted to be connected with the brake rigging, and means for securing said jaw to said structure, said structure, jaw, and means being adapted to permit the jaw and structure to be connected together in different relative positions.

NATHAN H. DAVIS.

Witnesses:
ARNOLD KATZ,
D. STEWART.